UNITED STATES PATENT OFFICE.

WILLIAM M. DALTON, OF ALVA, MISSISSIPPI, ASSIGNOR OF TWO-THIRDS TO LYCURGUS L. HAMMOND, OF SAME PLACE, AND WILLIAM L. NUGENT AND THOMAS A. McWILLIE, OF JACKSON, MISSISSIPPI.

ARTIFICIAL-STONE COMPOSITION AND METHOD OF MAKING SAME.

SPECIFICATION forming part of Letters Patent No. 543,572, dated July 30, 1895.

Application filed November 15, 1894. Serial No. 528,906. (No specimens.)

*To all whom it may concern:*

Be it known that I, WILLIAM M. DALTON, a citizen of the United States, residing at Alva, in the county of Montgomery and State of Mississippi, have invented certain new and useful Improvements in Artificial-Stone Composition and Methods of Making the Same; and I do hereby declare the following to be a full, clear, and exact description of the invention, such as will enable others skilled in the art to which it appertains to make and use the same.

My invention relates to an improved artificial-stone composition and method of making the same, in which, by the use of the hereinafter specified combination of fire-clay, silicic oxide, sand, and cement, and by the novel method of mixing the same, I secure, as a result, a stone more compact and of finer texture and color and capable of a higher degree of polish and more durable under exposure to water or the weather than those now in use, and which is indestructible by fire.

My composition consists of the following ingredients, combined in the proportions stated, viz: fire-clay, one part; silicic oxide ($SiO_2$) or rock crystal, three parts; best cement, one part; prepared sand, two parts.

I first take one part of powdered fire-clay and three parts of silicic oxide and thoroughly mingle them by agitation. I term this mixture "No. 1." I then take one part of best cement and two parts of prepared sand and mingle them in the same manner. This mixture I term "No. 2." Nos. 1 and 2 are then combined and mixed until all the parts become thoroughly commingled. This mixture is then ready to be put into the molds, which are made in the form in which it is desired to have the finished stone. The mixture is put into the molds a little at a time and is sprayed with pure water and packed by pressure-boards as the operation proceeds and until the mold is filled. The spraying uniformly moistens the material throughout, and the pressure which is brought to bear upon the material by the pressure-boards causes the damp molecules to be pressed close together and consequently form a more homogeneous mass as the stone hardens.

If the stone is to be formed into tombstones, mantels, columns, or other work requiring lettering, stamping, or ornamentation, it is taken out of the molds while in the plastic state and finished while thus in a condition to be easily worked, after which it is allowed to harden.

If the stone is to be made into pavements, sidewalks, or solid masonry, it is left in the molds until sufficiently hardened, which will require from twelve to forty-eight hours. It is then removed from the molds and is ready for use.

I do not restrict myself to precisely the proportions given, as different characters of work require that they should be varied—as, for instance, I use less fire-clay in masonry which is to be placed under and subject to the influence of water; and then, again, I use more of the sand, fire-clay, and silicic oxide in work which will not have the destructive action of water brought to bear upon it than upon that first named.

The use of fire-clay as distinct from ordinary clay is very important in the production of mantels, columns, &c., as it renders the same indestructible by fire, which latter result is very desirable in the modern construction of buildings.

My composition dries out from within instead of from without, which is plainly a great advantage as it makes the stone more compact.

The great advantage I obtain in mixing the silicic oxide and powdered fire-clay separate is that the molecules of silicic oxide become coated or dusted over thoroughly with fire-clay, as these two substances cling together. The same result is accomplished by mixing the cement and sand together, the former clinging to the latter. Then by bringing the two compounds thus separately mixed together the mass is made more homogeneous because the fire-clay binds itself readily and firmly to the silicic oxide and the cement to the sand, as it comes under the influence of the spray of water; and, finally, the clay and cement unite together with great strength thus forming a solid homogeneous stone, and that, too, of materials that neither water nor heat will affect.

The compound known in chemistry as silicic oxide ($SiO_2$) is what is generally called silica, of which silicon is the chemical base. Silicon having a strong affinity for oxygen unites with it and forms the above compound. This crystallized constitutes various kinds of quartz, such as rock, crystal, amethyst, agate, flint, &c. The word "sand," as used in the usual formula of artificial stone, means the ordinary sand of the surface with the dirt washed out, and while it may contain some silicon it may also and usually is made up largely of powdered stone or hard particles of earthy matter that do not contain pure silicon. Silica has a density of 2.6, and is insoluble and infusible unless combined with alkaline hydrates or carbonates or acted upon by hydrofluoric acid. Therefore it will remain unchanged in my composition, not being affected by heat or moisture. The fire-clay I use is peculiarly adapted to my purposes. It has been subjected to the greatest heat and heaved to the surface or near it. It is or has probably been kaolin subjected to great heat and pressure, and for this reason I call it "fire-clay."

I find alum, sal-soda, litharge, salt, soluble glass, &c., objectionable in my composition on account of their solubility or fusibility, or both. Alkaline substances combined with silica will cause it to fuse at high temperatures, thus damaging the stone when exposed to much heat.

What I claim as my invention, and desire to secure by Letters Patent, is—

1. A composition of matter to be used as artificial stone, consisting of fire clay, silicic oxide, sand, and cement, mixed in substantially the proportions named.

2. The method of making artificial stone which consists in first suitably mixing proper proportions of fire-clay and silica; second, suitably mixing cement and sand in proper proportions; third, combining the first mixture with the second and thoroughly agitating the same; fourth, placing small quantities of this combined mixture in a mold at a time and spraying water onto the mixture as it is being placed in the mold and, fifth, compressing the mixture by means of pressure boards, as it is placed in the mold, substantially as described.

In testimony whereof I hereunto affix my signature in presence of two witnesses.

WILLIAM M. DALTON.

Witnesses:
MARK L. CRICK,
WILLIAM R. FOWLER.